(12) United States Patent
Wang et al.

(10) Patent No.: US 12,212,367 B2
(45) Date of Patent: Jan. 28, 2025

(54) METHOD AND SYSTEM FOR QUANTUM TRANSMITTER

(71) Applicant: NATIONAL UNIVERSITY OF SINGAPORE, Singapore (SG)

(72) Inventors: Chao Wang, Singapore (SG); Ci Wen Lim, Singapore (SG); Koon Tong Goh, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 151 days.

(21) Appl. No.: 18/015,024

(22) PCT Filed: Jul. 7, 2021

(86) PCT No.: PCT/SG2021/050393
§ 371 (c)(1),
(2) Date: Jan. 6, 2023

(87) PCT Pub. No.: WO2022/010418
PCT Pub. Date: Jan. 13, 2022

(65) Prior Publication Data
US 2023/0261754 A1    Aug. 17, 2023

(30) Foreign Application Priority Data
Jul. 7, 2020   (SG) .......................... 10202006550Y

(51) Int. Cl.
*H04B 10/516*   (2013.01)
*H04B 10/54*    (2013.01)
(Continued)

(52) U.S. Cl.
CPC ..... *H04B 10/5161* (2013.01); *H04B 10/5165* (2013.01); *H04B 10/541* (2013.01); *H04B 10/5561* (2013.01); *H04L 9/0858* (2013.01)

(58) Field of Classification Search
None
See application file for complete search history.

(56) References Cited

U.S. PATENT DOCUMENTS

2003/0016430 A1    1/2003   Ransijn
2003/0030868 A1*   2/2003   Sasai .................. H04B 10/5051
                                                              398/140

(Continued)

FOREIGN PATENT DOCUMENTS

| CN | 103457155 A  | 12/2013 |
| CN | 104767609 A  | 7/2015  |
| JP | 2005268958 A | 9/2005  |

OTHER PUBLICATIONS

C. Bennet and G. Brassard, in Proceedings of IEEE International Conference Proceedings of IEEE International Conference on Computers Systems and Signal Processing (1984).

(Continued)

*Primary Examiner* — Darren E Wolf
(74) *Attorney, Agent, or Firm* — Volpe Koenig

(57) ABSTRACT

A method of encoding quantum information on one or several degrees of freedom of coherent states of photons of a baseband input optical signal, a quantum transmitter, and a computer-readable medium. The quantum transmitter comprises a modulator configured to encode quantum information on one or several degrees of freedom of coherent states of photons of a baseband input optical signal using sideband modulation of the baseband optical input signal.

15 Claims, 1 Drawing Sheet

(51) Int. Cl.
  *H04B 10/556* (2013.01)
  *H04L 9/08* (2006.01)

(56) References Cited

U.S. PATENT DOCUMENTS

| | | | |
|---|---|---|---|
| 2003/0189745 A1 | 10/2003 | Kikuchi | |
| 2004/0208614 A1* | 10/2004 | Price | H04B 10/505 398/152 |
| 2005/0254743 A1 | 11/2005 | Akiyama | |
| 2007/0104492 A1 | 5/2007 | Betts | |
| 2009/0074425 A1 | 3/2009 | Tanaka | |
| 2011/0318021 A1* | 12/2011 | Zhou | H04L 27/0014 375/376 |
| 2018/0343116 A1 | 11/2018 | Nordholt | |

OTHER PUBLICATIONS

H.-K. Lo, X. Ma, and K. Chen, Phys. Rev. Lett. 94, 230504 (2005).
X. Ma, B. Qi, Y. Zhao, and H.-K. Lo, Phys. Rev. A 72, 012326 (2005).
Qi, B., Huang, L.-L., Qian, L. & Lo, H.-K. Physical Review A 76, (2007).
H. Duan, etc., Chinese Phys. Lett. 30, 114209 (2013).
A. Marie and R. Alleaume, Phys. Rev. A 95, (2017).
H.-K. Lo, M. Curty, and B. Qi, Physical Review Letters 108, 130503 (2012).
Y. Liu, T.-Y. Chen, L.-J. Wang, H. Liang, G.-L. Shentu, J. Wang, K. Cui, H.-L. Yin, N.-L. Liu, L. Li, X. Ma, J. S. Pelc, M. M. Fejer, C.-Z. Peng, Q. Zhang, and J.-W. Pan, Physical Review Letters 111, 130502 (2013).
C. Wang, X.-T. Song, Z.-Q. Yin, S. Wang, W. Chen, C.-M. Zhang, G.-C. Guo, and Z.-F. Han, Phys. Rev. Lett. 115, 160502 (2015).
M. Lucamarini, Z. L. Yuan, J. F. Dynes, and A. J. Shields, Nature 557, 400 (2018).
S. Wang, D.-Y. He, Z.-Q. Yin, F.-Y. Lu, C.-H. Cui, W. Chen, Z. Zhou, G.-C. Guo, and Z.-F. Han, Phys. Rev. X 9, 021046 (2019).
C. Wang, D. Huang, P. Huang, D. Lin, J. Peng, and G. Zeng, Scientific Reports 5, 14607 (2015).
A single sideband from only one modulator. https://spie.org/news/1227-a-single-sideband-from-only-one-modulator?SSO=1.
A Modulator-Free Quantum Key Distribution Transmitter Chip. https://www.researchgate.net/publication/332221212_A_Modulator-Free_Quantum_Key_Distribution_Transmitter_Chip.
Patterning-effect-free_intensity_modulator_for_sec. https://www.researchgate.net/publication/326505869_Patterning-effect-free_intensity_modulator_for_secure_decoy-state_quantum_key_distribution.
A multi-protocol quantum key distribution transmitter. https://www.repository.cam.ac.uk/handle/1810/290847.
All-plasmonic Mach-Zehnder modulator enabling optical high-speed communication at the microscale https://www.researchgate.net/publication/311562013_All-plasmonic_Mach-Zehnder_modulator_enabling_optical_high-speed_communication_at_the_microscale.
Serikawa, T., et al.Schrodinger's cat in an optical sideband. Jul. 9, 2018 [Retrieved on Sep. 22, 2021 from https://arxiv.org/abs/1804.08905] Figs. 1-2, 5; pp. 1-4.
Laudenbach, F., et al., Pilot-assisted indradyne reception for high-speed continuous variable quantum key distribution with local oscillator. Mar. 10, 2019. [Retrieved on Sep. 22, 2021 from https://arxiv.org/pdf/1712.10242.pdf] pp. 1-12.
Fares, H., et al. From quantum physics to digital communication: Single sideband continuous phase modulation. Comptes Rendus Physique, Feb. 28, 2018, vol. 19, No. 1-2, pp. 54-63 [Retrieved on Sep. 22, 2021] <doi:https://doi. org/10.1016/j. crhy.2018.01.004> The whole document.
Quantum Key Distribution (QKD); Components and Internal Interfaces. Mar. 31, 2018 [Retrieved on Sep. 22, 2021 from https://www.etsi.org/deliver/etsi_gr/QKD/001_099/003/02.01.01_60/gr_qkd003v020101p.pdf] The whole document.
Search Report issued in corresponding European Patent Application No. 21837645.7 on Jul. 1, 2024, consisting of 9 pp.
Takahiro Serikawa, et al. Shrodinger's cat in an optical sideband. Arxiv.org. Cornell University Library. 201 Olin Library Cornell University, Ithaca, NY. Apr. 24, 2018.
Fabian Laudenbach, et al. Pilot-assisted intradyne reception for high-speed continuous-variable quantum key distribution with true local oscillator. Quantum. vol. 3. Jan. 17, 2019.
Fares Haifa, et al. From quantum physics to digital communication: single sideband continuous phase modulation. Comptes Rendus—Physique, Elsevier, Paris, FR, vol. 19, No. 1. Feb. 14, 2018.

* cited by examiner

METHOD AND SYSTEM FOR QUANTUM TRANSMITTER

FIELD OF INVENTION

The present invention relates broadly to a method of encoding quantum information on one or several degrees of freedom of coherent states of photons of a baseband input optical signal and to a quantum transmitter, in particular to a high-speed, robust and cost-effective quantum transmitter.

BACKGROUND

Any mention and/or discussion of prior art throughout the specification should not be considered, in any way, as an admission that this prior art is well known or forms part of common general knowledge in the field.

Quantum transmitter design is an important aspect of the development of quantum state generators in next generation high speed QKD systems for quantum cryptography, quantum sensing, and optical quantum computing, etc.

In one proposed design [2.5 GHz quantum key distribution system (Appl. Phys. Lett. 112, 171108 (2018))], a QKD system with a 2.5 GHz working frequency was demonstrated. As for the transmitter, the quantum signal is modulated by an intensity modulator in the base band of the optical carrier with a (relatively large) driving voltage of around 5 to 6 Volts ($V\pi$).

In another proposed design [High speed light source for decoy quantum key distribution (Chin. Opt. Lett., 12, 072702 (2014))], a phase randomized coherent state generation with 3 random intensities has been demonstrated. The authors constructed a precise current generation scheme to drive the laser diode, which is working in the gain-switching mode. The design is based on direct modulation of the laser diode and it is only applicable to protocols with phase randomized coherent states.

In another proposed design [Direct GHz intensity and phase modulator for QKD (Quantum Sci. Technol. 3, 045010 (2018))], the authors reported a direct intensity and phase modulation scheme based on optical injection locking. That is, no modulator is used in that design and it will suffer from frequency chirp of the direct modulation of the diode.

Embodiments of the present invention seek to address at least one of the above problems.

SUMMARY

In accordance with a first aspect of the present invention, there is provided a method of encoding quantum information on one or several degrees of freedom of coherent states of photons of a baseband input optical signal using sideband modulation of the baseband optical input signal.

In accordance with a second aspect of the present invention, there is provided a quantum transmitter comprising a modulator configured for encoding quantum information on one or several degrees of freedom of coherent states of photons of a baseband input optical signal using sideband modulation of the baseband optical input signal.

In accordance with a third aspect of the present invention, there is provided a computer-readable medium having data and/or instructions embodied therein which are configured to, when processed by a processing entity, instruct a quantum transmitter to execute the method of any one of claims 1 to 7.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figures 1A, 1B:
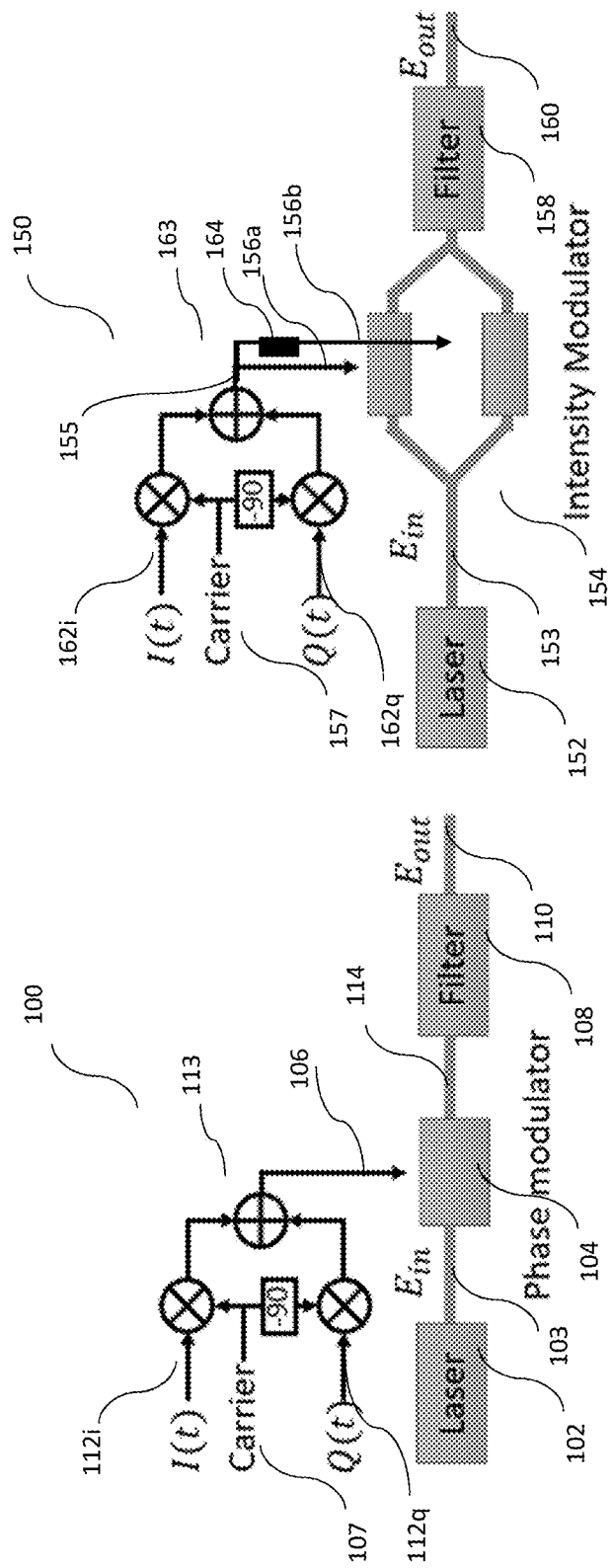
FIG. 1A shows a schematic diagram of a quantum transmitter according to an example embodiment.
FIG. 1B shows a schematic diagram of a quantum transmitter according to an example embodiment.

Embodiments of the present invention can provide a method and design for a high-speed, robust and cost-effective quantum transmitter. By modulating the sideband to generate signals according to an example embodiment, the need for a large driving voltage can advantageously be eliminated, which leads to a cost-effective and high-speed quantum transmitter.

Sideband modulations are utilized according to an example embodiment and sufficient isolation from the baseband is preferably provided by suitable selection of the working frequency of the driving signal and the bandwidth of the modulator. In an example embodiment, the fiber optical modulator and radio frequency techniques that are readily available for sub-100GBaud optical communication are suitable, advantageously enabling implementation with off-the-shelf technologies.

Quantum key distribution (QKD) is an emerging key exchange technique whose security is guaranteed solely by quantum mechanics, as is understood by a person skilled in the art. Since QKD is based on a physical principle instead of computational complexity like its classical counterparts, QKD is the only method proven to be able to provide information-theoretic security. When used with one-time-pad, it is capable of resisting against quantum computer-based attacks, which could break today's prevalent cryptosystems such as Rivest-Shamir-Adleman (RSA) and elliptic-curve cryptography (ECC).

A typical QKD system comprises a transmitter and a receiver, whose design directly determines the working frequency, robustness, and security performance of the entire system. The quantum transmitter includes the laser source(s) and modulator(s), which encode the information on one or several degrees of freedom of coherent states of photons like the intensity, phase, and polarization. For this purpose, individual intensity modulators (IM) and phase modulators (PM) are typically used. However, depending on the exact QKD protocols to be implemented, a voltage $V\pi$ of around 3 to 6 volts are required for both IM and PM to perform $\pi$ phase modulation. For certain applications like the phase randomization of the light, it may even require $2\pi$ phase modulation, which requires a higher voltage.

There are three main limitations in the above-mentioned existing transmitter schemes. Firstly, the high driving voltages typically require high gain signal amplification, leading to a more complex electrical circuit design and a larger nonlinearity of the modulation and thus, resulting in a larger intrinsic error of the system. Secondly, larger driving voltage will increase the power consumption of the system. As such, a heat dissipation measure typically has to be in place, which will limit the system compactness. Thirdly, for a quantum transmitter based on the Silicon-on-insulator platform used in photonic-chip-based systems, the free-carrier-injection (dissipation)-based high speed modulation will introduce not only the phase change but also the modulation-related-loss problem. While operating on high voltage seems to be unavoidable for existing modulation, it can easily result in signal distortion unless additional complicated loss compensation system(s) are applied.

In contrast, a quantum transmitter according to an example embodiment requires only relatively low operation voltage and can be implemented using readily available matured driving technology for classical communication. In addition, only a single modulator is needed according to an example embodiment, which is suitable for constructing a high speed, robust and cost-effective quantum transmitter, especially for photonic chip platform. The quantum transmitter scheme according to an example embodiment described herein applies to the coherent states of photons instead of single photon sources directly, using e.g. a decoy state technique for quantum key distribution.

The schematics of quantum transmitters 100, 150 according to example embodiments are illustrated in FIG. 1A and FIG. 1B, where FIG. 1A shows a quantum transmitter 100 according to an example embodiment with a phase modulator and FIG. 1B is a quantum transmitter 150 according to an example embodiment with an intensity modulator. The coherent state laser sources 102, 152 will emit either continuous-wave or pulsed laser, $E_{in}$ 103, 153:

$$E_{in} = E_0 e^{j(\omega_c t + \phi_c)} \quad (1)$$

Referring to FIG. 1A, in the phase modulator 104 the light wave from the laser source 102 is modulated by the RF driving signal 106 from an I/Q modulator 113 with a carrier 107 and I/Q signals 112i (I(t)), 112q (Q(t)), wherein the RF driving signal 106 advantageously can have a relatively low amplitude (compared to $V\pi$ voltage) with a certain carrier frequency $\omega_s$ from the carrier signal 107. Thereafter, an optical filter 108 will filter out the baseband and unwanted sideband signal, resulting in the intended modulation of the output light wave $E_{out}$ 110.

More specifically, for the quantum transmitter 100 with PM 104, instead of driving the PM 104 with $V\pi$ voltage directly, the applied driving signal 106 from the I/Q modulator 113 is in the form of:

$$V(t)\cos(\omega_s t + \varphi_s(t)) \quad (2)$$

with frequency $\omega_s$ and phase $\varphi_s$, which can be generated in high speed with existing matured communication technologies.

After applying the output from the I/Q modulator 113, i.e. driving signal 106 to the PM 104, the electrical field of the optical wave at numeral 114 can be presented by $$E_{PM}(t) \approx E_0 J_0(m) e^{j[\omega_c t + \phi_c]} + E_0 J_1(m) e^{j[(\omega_c + \omega_s)t + \frac{\pi}{2} + \phi_c + \varphi_s]} + E_0 J_{-1}(m) e^{j[(\omega_c - \omega_s)t + \frac{\pi}{2} + \phi_c - \varphi_s]} \quad (3)$$

where $m(t) = \pi V(t)/V_\pi \ll 1$ is the modulation depth, and $J_n(z)$ is the n-th Bessel function of the first kind.

After filtering out the baseband signal and the negative sideband, the positive sideband will be sent out as the final output $E_{out}$ 110 in this example embodiment:

$$E_0 J_1(m) e^{j[(\omega_c + \omega_s)t + \frac{\pi}{2} + \phi_c + \varphi_s]} \quad (4)$$

Accordingly, the output optical signal $E_{out}$ 110 will be modulated by the driving signal 106. Specifically, the amplitude of the output optical signal is $J_1(m)$, which is decided by the $$m(t) = \pi \frac{V(t)}{V_\pi}.$$

The phase of the output optical signal is $$\frac{\pi}{2} + \phi_c + \varphi_s,$$

which is the summation of the phase $\phi_c$ of the input optical signal $E_{in}$ 103 and the phase $\varphi_s$ of the driving signal 106. Thus, $2\pi$ phase modulation can be achieved with the help of electrical driving signal 106, and advantageously with only relatively low driving voltage.

As for the centre wavelength modulation, it can be seen from the expression of the output optical signal in equation (4) that the centre wavelength is controlled by the frequency $\omega_s$ of the carrier 107, and hence the electrical driving signal 106. Thus, the centre wavelength can be modulated by changing the frequency $\omega_s$.

Accordingly, all of the intensity, phase and the centre wavelength of the quantum state can be modulated via a single PM 104 to encode quantum information on one or several degrees of freedom of coherent states of photons of a baseband input optical signal, which provides a simple, robust and cost-effective way for generating/encoding a quantum state, according to an example embodiment.

Other than the quantum transmitter 100 with single PM 104 according to an example embodiment, in quantum transmitter 150 one IM 154 is used to achieve the sideband modulation with a suppressed carrier according to an example embodiment, as shown in FIG. 1B, which will further reduce the requirement for the narrow band optical filter.

Again, the optical input signal $E_{in}$ 153 can be expressed as:

$$E_{in} = E_0 e^{j(\omega_c t + \phi_c)} \quad (5)$$

The optical signal after the IM 154 can be expressed as:

$$E_{out} = \frac{1}{2} E_{in} e^{j\left(\frac{\pi}{V_\pi} V_u\right)} + \frac{1}{2} E_{in} e^{j\left(\frac{\pi}{V_\pi} V_l\right)} \quad (6)$$
$$= E_{in} \cos\left[\frac{\pi}{2V_\pi}(V_u - V_l)\right] e^{j\left[\frac{\pi}{2V_\pi}(V_u + V_l)\right]}$$

where $V_u = V \cos(\omega_s t + \varphi_s) + V_{DC1}$; $V_l = V \cos(\omega_s t + \varphi_s + \phi) + V_{DC2}$ as the driving signals 156a/b; and $\omega_s$ is the frequency of the carrier 157. It is noted that two modulation signals are provided to respective arms of the IM 154 in this example embodiment in which a Lithium Niobate fiber intensity modulator is used, which is commonly used in fibre and chip communication systems, as will be appreciated by a person skilled in the art. This intensity modulator 154 is composed of a Mach-Zehnder interferometer whose two arms, referred to as upper, u, and lower, l, herein, can apply driving voltages independently. Since there is only a phase difference between the two arms, a single RF driving signal 155 from an I/Q modulator 163 with a carrier 157 and I/Q signals 162i (I(t)), 162q (Q(t)) can be used, split to two different paths 156a/b to drive the two arms, and using a RF phase shifter 164 to phase shift the signal to the lower arm. Again, the RF driving signal 155 advantageously can have a relatively low amplitude (compared to $V\pi$ voltage) with a certain carrier frequency $\omega_s$ from the carrier signal 157.

With $$m = \pi\frac{V}{V_\pi}, \varphi_1 = \pi\frac{V_{DC1}}{V_\pi}, \varphi_2 = \pi\frac{V_{DC2}}{V_\pi}, \Delta\varphi = \varphi_1 - \varphi_2$$

decided by bias port, equation (6) can be re-written as:

$$E_{out} = \tfrac{1}{2}E_{in}e^{j\varphi_2}[\Sigma_{n=-\infty}^{\infty}(e^{j\Delta\varphi}+e^{jn\phi})j^n J_n(m)e^{jn\omega_s t}] \quad (7)$$

Further, if $\Delta\varphi = \pi$ (bias port), $\phi = \pi$ (phase difference between $V_u$, $V_l$ 156a/b), equation (7) can be approximated as:

$$E_{out} \approx J_1(m)e^{j[(\omega_c+\omega_s)t-\frac{\pi}{2}+\varphi_s+\Delta\varphi]} + J_1(m)e^{j[(\omega_c-\omega_s)t-\frac{\pi}{2}-\varphi_s+\Delta\varphi]} \quad (8)$$

Accordingly, double sideband modulation of the baseband optical input signal with suppressed baseband of the baseband optical input signal is achieved after the IM 154.

In this example embodiment, if optical filter 158 is applied to filter out the negative sideband, and only preserve the positive sideband signal, the output from the quantum transmitter 150 is:

$$J_1(m)e^{j[(\omega_c+\omega_s)t-\frac{\pi}{2}+\varphi_s+\Delta\varphi]} \quad (9)$$

Accordingly, the output optical signal $E_{out}$ 160 will be modulated by the driving signal 155 (via paths 156a/b). Specifically, the amplitude of the output optical signal is $J_1(m)$, which is decided by the $$m(t) = \pi\frac{V(t)}{V_\pi}.$$

The phase of the output optical signal is $$-\frac{\pi}{2} + \varphi_s + \Delta\varphi$$

Accordingly, it can be seen that the phase of the output optical signal is related to the phase of the RF driving signal directly.

As for the centre wavelength modulation, it can be seen from the expression of the output optical signal in equation (9) that the centre wavelength is controlled by the frequency $\omega_s$ of the electrical driving signal 155 (via paths 156a/b). Thus, the centre wavelength can be modulated by changing the frequency $\omega_s$.

Accordingly, all of the intensity, phase and the centre wavelength of the quantum state can be modulated via a single IM 154 to encode quantum information on one or several degrees of freedom of coherent states of photons of a baseband input optical signal, which provides a simple, robust and cost-effective way for generating/encoding a quantum state, according to an example embodiment, and with reduced requirement for the narrow band optical filter, since only the unwanted sideband needs to be filtered due to the carrier suppression in the IM 154.

INDUSTRIAL APPLICATIONS OF EXAMPLE EMBODIMENTS

Due to the significant advantage(s) in terms of the simplicity of design, robustness, and cost, embodiments of the present invention can be highly relevant for the miniaturization and low-cost development of quantum applications, including in next generation high speed QKD systems, in quantum sensing, and in optical quantum computing, etc. It is noted that while the quantum transmitter scheme according to example embodiments described herein apply to the coherent states instead of single photon source directly, in the quantum communication field, especially quantum key distribution, the coherent states together with decoy state technique is preferable comparing to real single photon source. Thus, the quantum transmitter scheme according to example embodiments can be widely used for practical QKD systems. In the following, some examples on how the quantum transmitter scheme according to example embodiments can be applied in quantum key distribution system will be described.

The Bennett-Brassard 84 (BB84) [1] protocol is one of the most commonly deployed QKD protocols, whose security is relying on the non-cloning theorem of arbitrary (mutually non-orthogonal) quantum states. In this protocol, the signal is encoded on the physical degree of freedom (e.g. polarization, phase) of single photon states. However, since the on-demand single photon source is not commercially available yet, the decoy state technique [2,3] is typically used.

In the decoy state technique, instead of sending the real single photon state directly, measurement results of single photon events can be bounded by analysing the results of phase-randomised coherent states (PRCS) with a series of intensities.

The density matrix of the PRCS can be rewritten as mixture of density matrixes of a series of photon number states, which follows the Poisson distribution. If PRCS with 3 intensities are taken as an example, the successful probability of the three PRCS can be presented as:

$$Q_{\mu_1} = p_{\mu_1}^{0}Y_0 + p_{\mu_1}^{1}Y_1 + p_{\mu_1}^{2}Y_2 + p_{\mu_1}^{3}Y_3 + \ldots + p_{\mu_1}^{N}Y_N + \quad (10a)$$

$$Q_{\mu_2} = p_{\mu_2}^{0}Y_0 + p_{\mu_2}^{1}Y_1 + p_{\mu_2}^{2}Y_2 + p_{\mu_2}^{3}Y_3 + \ldots + p_{\mu_2}^{N}Y_N + \quad (10b)$$

$$Q_{\mu_3} = p_{\mu_3}^{0}Y_0 + p_{\mu_3}^{1}Y_1 + p_{\mu_3}^{2}Y_2 + p_{\mu_3}^{3}Y_3 + \ldots + p_{\mu_3}^{N}Y_N + \quad (10c)$$

where $Q_{\mu_1}$ indicates the probability that the system obtain successful events when PRCS with intensity $\mu_1$ is used. $p_{\mu_1}^{N}$ means the probability of N photon number state occurs in PRCS with intensity $\mu_1$, and $Y_N$ means the probability that the system obtain successful events when N photon number state been used, so on and so forth.

Therefore, by solving the linear equations, one can readily obtain $Y_1$, which is the single photon contribution of the system.

With the quantum transmitter according to example embodiments, intensity modulation, phase modulation/randomization of the coherent states can be readily achieved, preferably with a single modulator, which is advantageous in QKD system with decoy state technique.

In addition, the quantum transmitter scheme according to example embodiments based on sideband modulation generates the coherent state from vacuum, i.e. the sideband optical mode is initially in vacuum state, and the energy transfer from the baseband displaces the quantum state of the sideband mode from vacuum state to a coherent state. Therefore, the quantum transmitter scheme according to example embodiments is capable of providing high extinction ratio optical intensity modulation and pulse generation, which is very suitable for quantum systems where high extinction ratio optical intensity modulation is required [4-6].

Specifically, when the optical field at the frequency of interest to generate single sideband signal, $\omega_c+\omega_s$, is vacuum before the modulation scheme has been applied, and one looks into this specific wavelength and filters out the undesired wavelengths, one can see that high extinction ratio intensity modulation (i.e. the ratio of the lowest intensity of the signal comparing to the highest intensity of the signal) of output optical signal can be achieved, by applying high extinction ratio amplitude modulation of the electrical driving signal. This can be done via modulating or switching on/off of both I/Q signal e.g. 112$i$, 112$q$ and the RF carrier signal e.g. 107 in the quantum transmitter e.g. 100, as shown in FIG. 1A, and similarly in the quantum transmitter 150 as shown in FIG. 1B.

As a comparison, a conventional method for generating high extinction ratio optical intensity modulation in quantum systems is by using one or sequential high performance optical modulators [5, 12], which is costly and complex in bias control. In example embodiments of the present invention, high extinction ratio optical intensity modulation in quantum systems can be achieved with a single modulator, which is more cost-effective and robust in performance.

Moreover, the quantum transmitter scheme according to example embodiments can provide an easy way to fine tune the central wavelength of the quantum states, which can be advantageous for QKD protocols like the measurement-device-independent QKD [7-9], and twin-field QKD [10, 11]. In the existing experimental implementations, either the temperature control of the laser diode [8,11] or the laser wavelength locking to a molecular absorption reference [9] are used. However, they only possess a limited wavelength tunability of 10 MHz. On the other hand, it has been shown that in the twin-field QKD, the performance of the system highly relies on the similarity of the central wavelength of independent lasers from different users [10]. With the quantum transmitter scheme according to example embodiments, the central wavelength of the output quantum states can be fine-tuned by changing the frequency of the RF carrier, which can easily reach precision less than Hz thanks to the mature RF techniques. Thus, the quantum transmitter scheme according to example embodiments can be advantageous in the quantum scenario where wavelength tuning of the optical quantum states are required.

In one embodiment, a method of encoding quantum information on one or several degrees of freedom of coherent states of photons of a baseband input optical signal using sideband modulation of the baseband optical input signal is provided.

Performing the sideband modulation may comprise using a phase modulator, and driving the phase modulator using a driving signal having a driving frequency and a driving phase. The driving signal may be generated using an I/Q modulator. The method may comprise filtering the baseband and an unwanted sideband from the modulated baseband optical signal.

Performing the sideband modulation may comprise using a Mach-Zehnder intensity modulator, and driving arms of the Mach-Zehnder intensity modulator using two driving signals, respectively, having a driving frequency with a phase difference between the two driving signals for double sideband modulation of the baseband optical input signal with baseband suppression. The two driving signals may be generated using an I/Q modulator to generate an initial driving signal as one of the two driving signals and using a phase shifted version of the initial signal as the other one of the two driving signals. The method may comprise filtering an unwanted sideband from the modulated baseband optical signal.

In one embodiment, a quantum transmitter comprising a modulator configured to encode quantum information on one or several degrees of freedom of coherent states of photons of a baseband input optical signal using sideband modulation of the baseband optical input signal. is provided.

The modulator may comprise a phase modulator, and the quantum transmitter may further comprise a driver configured to drive the phase modulator using a driving signal having a driving frequency and a driving phase. The driver may comprise an I/Q modulator. The quantum transmitter may comprise a filter configured to filter the baseband and an unwanted sideband from the modulated baseband optical signal.

The modulator may comprise a Mach-Zehnder intensity modulator, and the quantum transmitter may further comprise a driver configured to drive arms of the Mach-Zehnder intensity modulator using two driving signals, respectively, having a driving frequency with a phase difference between the two driving signals for double sideband modulation of the baseband optical input signal with baseband suppression. The driver may comprise an I/Q modulator configured to generate an initial driving signal as one of the two driving signals and an RF phase shifter configured to generate a phase shifted version of the initial signal as the other one of the two driving signals. The quantum transmitter may comprise a filter configured to filter an unwanted sideband from the modulated baseband optical signal.

In one embodiment, a computer-readable medium is provided, having data and/or instructions embodied therein which are configured to, when processed by a processing entity, instruct a quantum transmitter to execute the method of the embodiments described herein.

Embodiments of the present invention can have one or more of the following features and associated benefits/advantages:

| Feature | Benefit/Advantage |
| --- | --- |
| Cost-effective | In example embodiments, relatively low driving voltages are required, which largely reduces the power consumption of the transmitter. |
| High speed operation | By reducing the voltage requirement, the quantum transmitter according to example embodiments can operate at a significantly higher speed for a given signal-to-noise ratio. |
| High robustness | In example embodiments, a minimal number of modulators are required for quantum signal generation, which greatly reduces the system complicity and cost. |

Aspects of the systems and methods described herein, such as the control of the various components of the transmitters according to example embodiments, may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. When received into any of a variety of circuitry (e.g. a computer), such data and/or instruction may be processed by a processing entity (e.g., one or more processors).

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

REFERENCES

[1] C. Bennet and G. Brassard, in Proceedings of IEEE International Conference Proceedings of IEEE International Conference on Computers Systems and Signal Processing (1984).
[2] H.-K. Lo, X. Ma, and K. Chen, Phys. Rev. Lett. 94, 230504 (2005).
[3] X. Ma, B. Qi, Y. Zhao, and H.-K. Lo, Phys. Rev. A 72, 012326 (2005).
[4] Qi, B., Huang, L.-L., Qian, L. & Lo, H.-K. Physical Review A 76, (2007).
[5] H. Duan, etc., Chinese Phys. Lett. 30, 114209 (2013).
[6] A. Marie and R. Alléaume, Phys. Rev. A 95, (2017).
[7] H.-K. Lo, M. Curry, and B. Qi, Physical Review Letters 108, 130503 (2012).
[8] Y. Liu, T.-Y. Chen, L.-J. Wang, H. Liang, G.-L. Shentu, J. Wang, K. Cui, H.-L. Yin, N.-L. Liu, L. Li, X. Ma, J. S. Pelc, M. M. Fejer, C.-Z. Peng, Q. Zhang, and J.-W. Pan, Physical Review Letters 111, 130502 (2013).
[9] C. Wang, X.-T. Song, Z.-Q. Yin, S. Wang, W. Chen, C.-M. Zhang, G.-C. Guo, and Z.-F. Han, Phys. Rev. Lett. 115, 160502 (2015).
[10] M. Lucamarini, Z. L. Yuan, J. F. Dynes, and A. J. Shields, Nature 557, 400 (2018).
[11] S. Wang, D.-Y. He, Z.-Q. Yin, F.-Y. Lu, C.-H. Cui, W. Chen, Z. Zhou, G.-C. Guo, and Z.-F. Han, Phys. Rev. X 9, 021046 (2019).
[12] C. Wang, D. Huang, P. Huang, D. Lin, J. Peng, and G. Zeng, Scientific Reports 5, 14607 (2015).

The invention claimed is:

1. A method of encoding quantum information on one or several degrees of freedom of coherent states of photons of a baseband input optical signal comprising:
   performing sideband modulation of the baseband optical input signal to produce an optical output signal with the quantum information on the one or several degrees of freedom of the coherent states, wherein performing the sideband modulation comprises:
   using a phase modulator and driving the phase modulator using a first driving signal having a first driving frequency and a first driving phase, and varying a frequency of the optical output signal by varying the first driving frequency of the first driving signal; or
   using a Mach-Zehnder intensity modulator and driving arms of the Mach-Zehnder intensity modulator using two driving signals, respectively, having a second driving frequency with a phase difference between the two driving signals for double sideband modulation of the baseband optical input signal with baseband suppression, and varying a frequency of the optical output signal by varying the second driving frequency of the two driving signals.

2. The method of claim 1, wherein the first driving signal is generated using an I/Q modulator.

3. The method of claim 1, comprising filtering the baseband and an unwanted sideband from the modulated baseband optical signal.

4. The method of claim 1, wherein the two driving signals are generated using an I/Q modulator to generate an initial driving signal as one of the two driving signals and using a phase shifted version of the initial signal as the other one of the two driving signals.

5. The method of claim 1, comprising filtering an unwanted sideband from the modulated baseband optical signal.

6. The method of claim 1, wherein an amplitude of the first driving signal is lower than a voltage required to achieve a π-phase shift on the baseband using the phase modulator.

7. The method of claim 1, wherein an amplitude of the two driving signals is lower than a voltage required to achieve a π-phase shift on the baseband using the Mach-Zehnder intensity modulator.

8. A quantum transmitter comprising a modulator configured to encode quantum information on one or several degrees of freedom of coherent states of photons of a baseband input optical signal using sideband modulation of the baseband optical input signal, wherein the modulator comprises:
- a phase modulator and a first driver, the phase modulator configured to driven by a first driving signal from the driver, the first driving signal having a first driving frequency and a first driving phase, and wherein the first driver is configured for varying a frequency of the optical output signal by varying the first driving frequency of the first driving signal; or
- a Mach-Zehnder intensity modulator and a second driver, the Mach-Zehnder modulator being configured such that driving arms of the Mach-Zehnder intensity modulator are driven using two driving signals, respectively, having a second driving frequency with a phase difference between the two driving signals for double sideband modulation of the baseband optical input signal with baseband suppression, and wherein the second driver is configured for varying a frequency of the optical output signal by varying the second driving frequency of the two driving signals.

9. The quantum transmitter of claim 8, wherein the first driver comprises an I/Q modulator.

10. The quantum transmitter of claim 8, comprising a filter configured to filter the baseband and an unwanted sideband from the modulated baseband optical signal.

11. The quantum transmitter of claim 8, wherein the second driver comprises an I/Q modulator configured to generate an initial driving signal as one of the two driving signals and an RF phase shifter configured to generate a phase shifted version of the initial signal as the other one of the two driving signals.

12. The quantum transmitter of claim 8, comprising a filter configured to filter an unwanted sideband from the modulated baseband optical signal.

13. The quantum transmitter of claim 8, wherein the first driver is configured for providing an amplitude of the first driving signal that is lower than a voltage required to achieve a π-phase shift on the baseband using the phase modulator.

14. The quantum transmitter of claim 8, wherein the second driver is configured for providing an amplitude of the two driving signals that is lower than a voltage required to achieve a π-phase shift on the baseband using the Mach-Zehnder intensity modulator.

15. A computer-readable medium having data and/or instructions embodied therein which are configured to, when processed by a processing entity, instruct the quantum transmitter of claim 8 to execute the method of claim 1.

* * * * *